United States Patent [19]

DeWitt

[11] Patent Number: 4,660,848
[45] Date of Patent: Apr. 28, 1987

[54] CHASSIS WITH TELESCOPING ARTICULATED STINGER

[75] Inventor: Nicklas R. DeWitt, Portola Valley, Calif.

[73] Assignee: X-Ten Corporation, San Francisco, Calif.

[21] Appl. No.: 748,085

[22] Filed: Jun. 24, 1985

[51] Int. Cl.$^4$ .............................................. B62D 53/06
[52] U.S. Cl. .................................. 280/404; 280/142; 280/438 R; 280/482
[58] Field of Search ............... 280/404, 142, 656, 482, 280/438 R, 438 A; 414/679, 563

[56] References Cited

U.S. PATENT DOCUMENTS

| | | | |
|---|---|---|---|
| 3,087,744 | 4/1963 | Tanenbaum | 280/404 |
| 3,788,672 | 1/1974 | Tharp | 280/404 |
| 3,972,540 | 8/1976 | Donaldson | 280/404 |
| 4,226,436 | 10/1980 | Donaldson | 280/404 |
| 4,561,671 | 12/1985 | DeWitt et al. | 280/404 |
| 4,566,714 | 1/1986 | DeWitt et al. | 280/404 |

OTHER PUBLICATIONS

Peerless, a Divison of Lear Siegler, Inc. Brochure, Peerless-Page Ind. Ltd., 575 Page Avenue, Penticton, B.C.

Primary Examiner—John J. Love
Assistant Examiner—Mitchell J. Hill
Attorney, Agent, or Firm—Townsend and Townsend

[57] ABSTRACT

A chassis with a telescoping articulated stinger for receiving and hauling containers over 40 feet is disclosed where the chassis rear tandem wheels assist in steering. The chassis mounts conventionally and pivotally at a fifth wheel to a towing tractor with a forward bolster for supporting the forward end of a container. The chassis has a telescoping stinger connecting the rear set of tandem wheels with overlying rear bolster for conventionally supporting and towing short cargo containers, preferably of 20 to 40 feet in length. Where a container of greater than 40 feet is desired to be hauled on the chassis, the stinger is telescoped to expose an articulating joint and both bolsters are allowed to pivot with respect to the chassis. The towing tractor is locked to the chassis at the fifth wheel, and the articulated stinger adjusted in length for the desired lever arm to permit optimum tandem wheel steering. Upon encountering a corner, the stinger articulates and telescopes relative to the hauled and towed container to steer the tandem wheel set to assist overlong container loads of more than 40 feet in negotiating turns.

5 Claims, 10 Drawing Figures

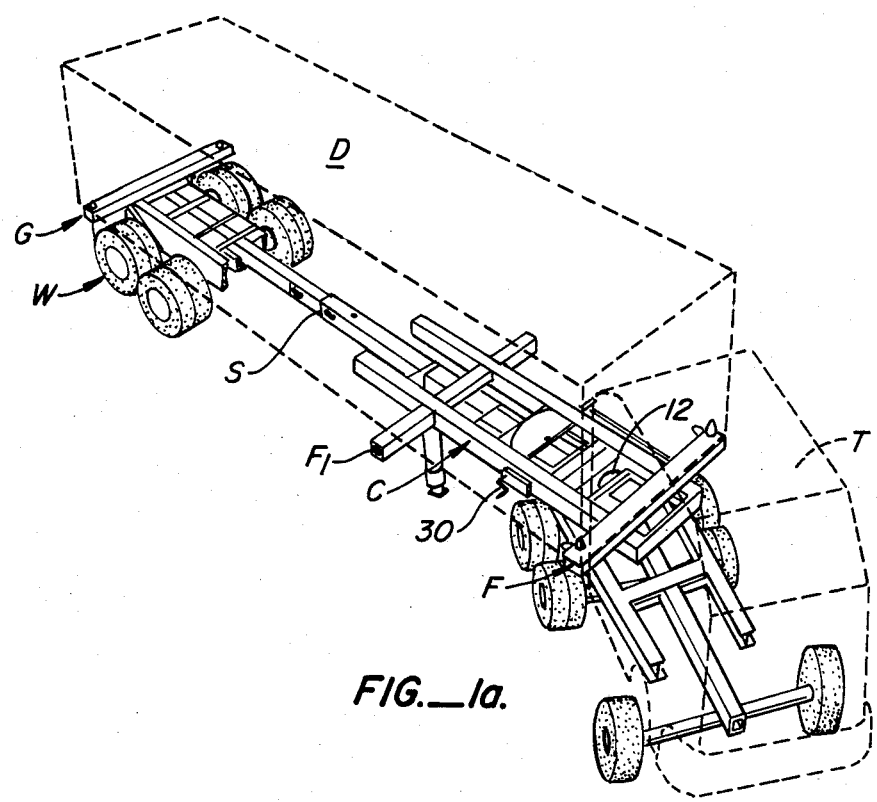
FIG._1a.
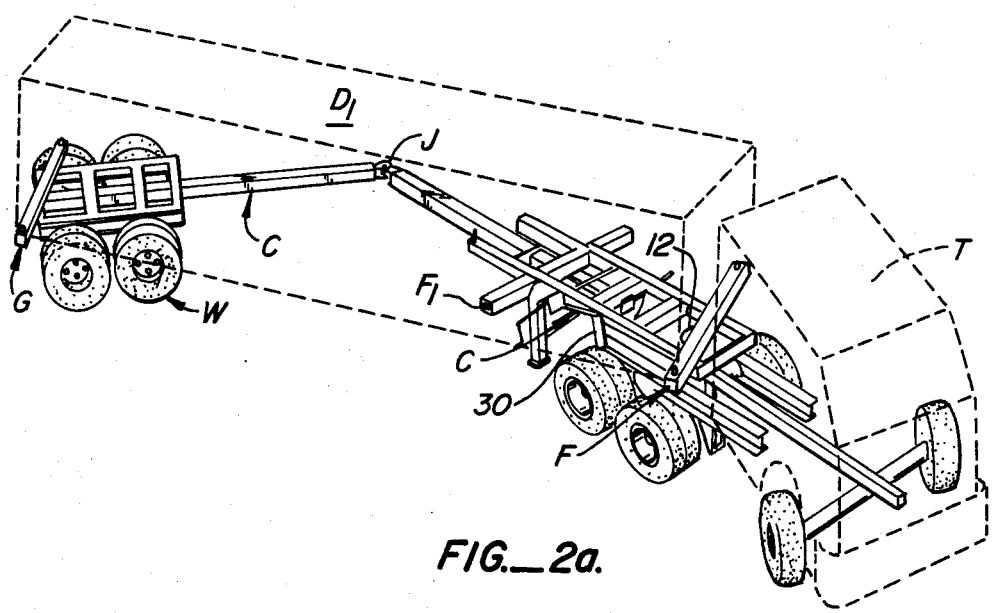
FIG._2a.

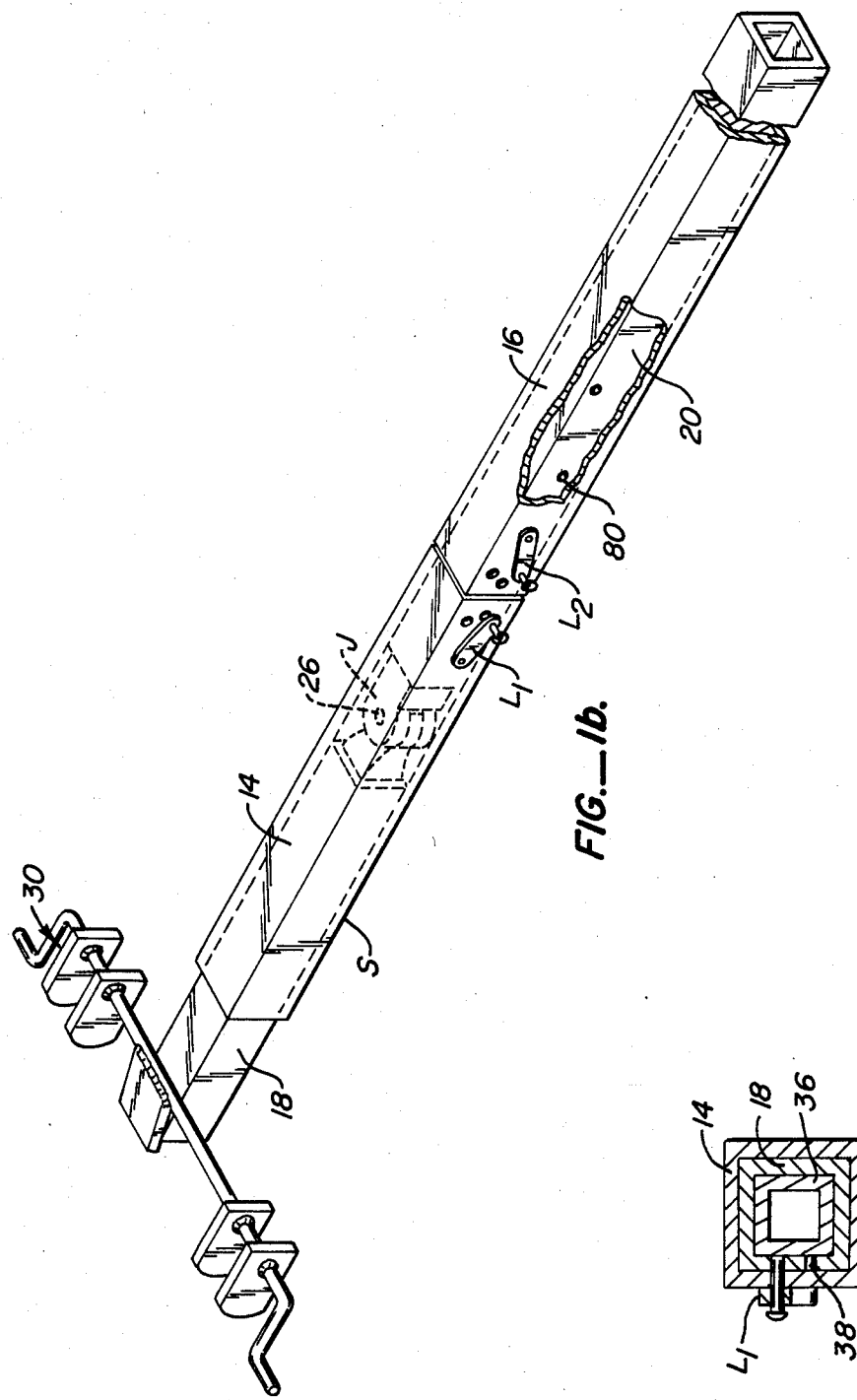

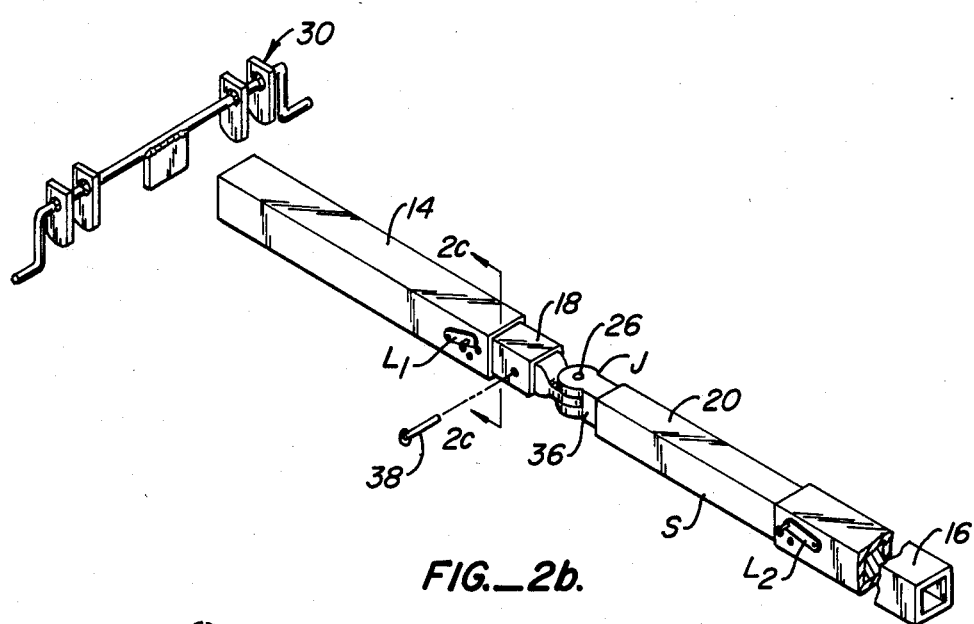
FIG._2b.
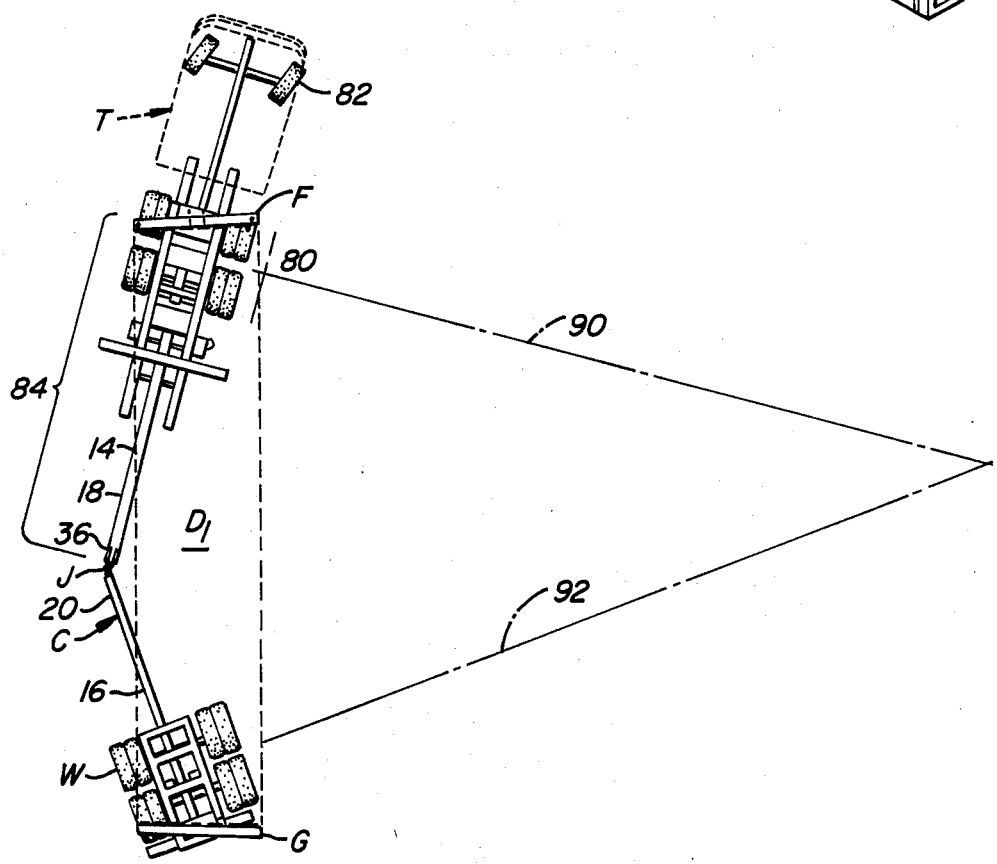
FIG._3.

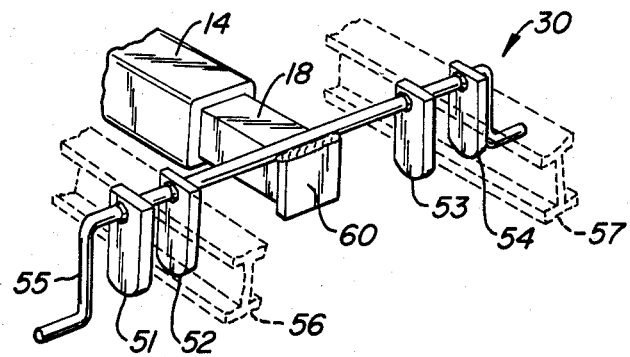
FIG._4a.
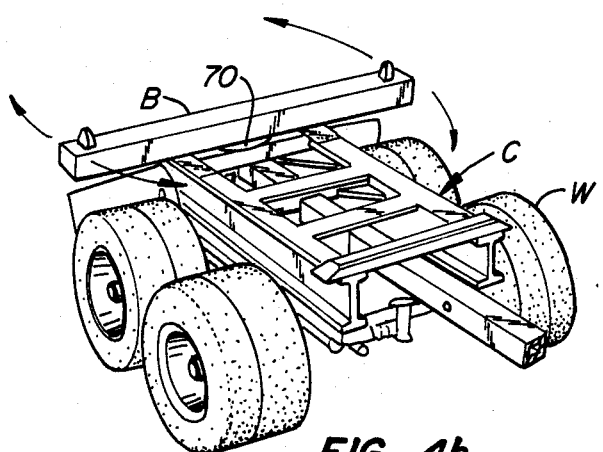
FIG._4b.
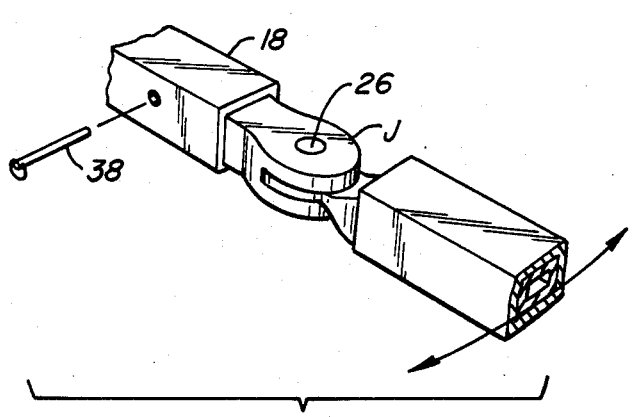
FIG._4c.
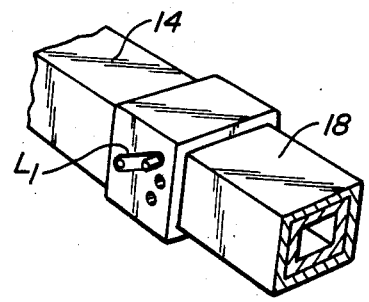
FIG._4d.

CHASSIS WITH TELESCOPING ARTICULATED STINGER

BACKGROUND OF THE INVENTION

This invention relates to chassis for hauling shipping containers. More particularly a chassis with a telescoping and articulated stinger or single central beam is disclosed for steering a rear tandem wheel set of the chasis. This steering feature enables loads of over 40 feet to negotiate corners such as those found in crowded metropolitan areas or serpentine overland routes.

DESCRIPTION OF THE PRIOR ART

Logging trailers having steerable rear wheel tandem sets are known. Typically, a permanently modified tractor with a protruding hitch point has a trailer connection to a rigid single beam or stinger. A tandem set of wheels is permanently attached to the rigid single beam. Logs are mounted to a forward bolster overlying the chassis rear wheel and a rear bolster overlying the tandem rear wheel set. Both bolsters pivot. When the trailer loaded with logs negotiates a sharp turn, the logs maintain the length of the load. The rigid single beam pivots and is provided with a telescoping section to steer the rear tandem wheel set relative to the load. Negotiation around sharp corners occurs.

Telescoping trailers for hauling loads are known. For example, see co-pending patent applications; Improved Trailer for Containerized Load, Ser. No. 589,967, filed Mar. 15, 1984 now abandoned; and Extensible Chassis for Hauling Container, Ser. No. 491,142, filed May 3, 1983 now issued as U.S. Pat. No. 4,561,671 on Dec. 31, 1985.

SUMMARY OF THE INVENTION

A chassis with a telescoping articulated stinger for receiving and hauling containers over 40 feet is disclosed where the chassis rear tandem wheels assist in steering. The chassis mounts conventionally and pivotally at a fifth wheel to a towing tractor with a forward bolster for supporting the forward end of a container. The chassis has a telescoping stinger connecting the rear set of tandem wheels with overlying rear bolster for conventionally supporting and towing short cargo containers, preferably of 20 to 40 feet in length. Where a container of greater than 40 feet is desired to be hauled on the chassis, the stinger is telescoped to expose an articulating joint and both bolsters are allowed to pivot with respect to the chassis. The towing tractor is locked to the chassis at the fifth wheel, and the articulated stinger adjusted in length for the desired lever arm to permit optimum rear tandem wheel steering. Upon encountering a corner, the stinger articulates and telescopes relative to the hauled and towed container to steer the tandem wheel set to assist overlong container loads of more than 40 feet in negotiating turns.

OTHER OBJECTS AND ADVANTAGES OF THE INVENTION

An object of this invention is to disclose a trailer which telescopes to steer a rear tandem wheel set. According to this aspect of the invention, a container is mounted to a chassis at pivotal front and pivotal rear bolsters. The front bolster overlies the chassis fifth wheel and driving tandem tractor wheel set. The rear bolster overlies an idle and towed rear tandem wheel set. A single telescoping stinger or beam telescopes to expose an articulated joint. By the expedient of locking the tractor to the forward end of the chassis, the stinger or single beam articulates and telescopes when the towing tractor chassis and hauled container steer around a corner. As a result of the telescoping and articulating stinger, the rear tandem wheel set steers relative to the overlying bolster and container to permit sharp corners to be negotiated.

An advantage of this invention is that the disclosed telescoping stinger can be utilized to contract the trailer in length and prevent articulation. According to this aspect of the invention, the tractor is unlocked from the forward portion of the chassis. The chassis is telescoped in length to receive a short container, typically 40 feet or less in length. The articulating joint on the stinger telescopes within a receiving member. Consequently, the stinger becomes rigid. Conventional pivot at the fifth wheel is restored. Towing of the mounted container on the chassis is completely conventional.

Another object of this invention is to disclose a chassis lock to the towing tractor. The reader will be aware that where a short container of 40 feet or less is hauled, the chassis must be free to pivot relative to the tractor at the fifth wheel. Where an overlong container is hauled of greater than 40 feet, it is desired that the chassis must not be free to pivot relative to the tractor at the fifth wheel. Accordingly, a lock mechanism between a conventional tractor and the forward portion of a towed chassis is provided for selectively locking the tractor to and unlocking the tractor from the towed chassis.

Yet another object of this invention is to provide a telescoping chassis wherein the locking mechanism between the forward portion of the tractor and chassis responds to the telescoped length of the chassis. Accordingly, the telescoping beam or stinger at its forward end hits a crossbar having a locking mechanism to the towing tractor. This contact only occurs when the trailer is telescoped to a short length. Responsive to contact with the paddle, the locking mechanism unlocks the tractor from the forward portion of the chassis allowing the towed chassis to pivot relative to the tractor at the fifth wheel.

Conversely, and where the chassis is expanded to a length of 40 feet or more for the reception of a long load, the telescoping beam pivots out of the way of the chassis locking mechanism. When the tractor is aligned straight to the chassis, locking between the forward portion of the chassis and the towing tractor can occur. Thereafter, articulated steerage of the trailer around corners can occur.

BRIEF DESCRIPTION OF THE DRAWINGS

Other objects, features, and advantages of this invention will become more apparent after referring to the following specification and attached claims in which:

FIG. 1A is a perspective view of the chassis of this invention towed by a turning towing tractor (only partially shown) with a container in the order of 20 feet shown in phantom;

FIG. 1B is a view of the single telescoping beam or stinger here adjusted for towing of the 20 foot container;

FIG. 2A is a view similar to FIG. 1A showing the chassis telescoped to receive a 45 foot container and the turning towing tractor locked to the forward portion of the chassis to enable the rear tandem wheel set to be steered for negotiating tight corners;

FIG. 2B is a telescoped view of the telescoping beam or stinger, here telescoped to a length to permit steering of the tandem rear wheel set;

FIG. 2C is a section of the telescoping stinger taken across lines 2C—2C of FIG. 2B;

FIG. 3 is a plan view of the chassis of this invention hauling a container in the order of 45 feet or more illustrating the steering action of the tandem rear wheel set to negotiate a tight corner;

FIG. 4A is a view of a locking mechanism utilized for locking the forward portion of the chassis to a conventional tractor;

FIG. 4B is a view of the towing tandem wheel set of the tractor overlying the fifth wheel illustrating pivotal movement of the bolster, the movement of the bolster relative to the rear tandem wheel being identified;

FIGS. 4C and 4D are perspective details of the locking mechanism for the articulating and telescoping stinger.

Referring to FIG. 1A, a tractor T is shown pivotally attached at a fifth wheel 12 to tow chassis C having a 28 foot container D mounted on the chassis. Container D rests on forward bolster F and on rear bolster G and is mounted to the bolsters by conventional corner casting fittings on the container and locks on the chassis. An intermediate stinger S is shown in the view of FIG. 1B telescoped to the contracted position.

Referring to FIG. 2A, a tractor T is shown locked relative to the fifth wheel 12 towing the extended chassis C having a Forty eight (48) foot container shown on the chassis. Forty eight (48) foot Container D1 rests on the forward bolster F pivoted with respect to the chassis and the rear bolster G pivoted with respect to the chassis at conventional corner casting fittings on the container and on the chassis. An intermediate stinger S is shown in the view of FIG. 2B telescoped to the extended and articulated disposition to permit steering of the rear set of tandem wheels.

From the two views of FIG. 1A and 2A, the reader can see and understand that the purpose of this invention is to have the rear wheels W steer when the chassis C of this invention tows overlong containers D1.

In order that this invention may be fully understood, the stinger will first be discussed with respect to FIGS. 1B and 2B. Extension of the stinger to and from an articulating disposition will be set forth.

Secondly, an explanation will be made of how, when the chassis is in the extended position, the forward portion of the chassis is locked to the tractor. This locking of the forward portion of the chassis permits articulation and telescoping of the stinger to steer the rear wheel set.

Finally, the pivotal function of the bolsters in carrying the mounted container will be set forth.

Thereafter, the sequence of utilizing the chassis to pick up a short load, utilizing the chassis to pick up a long load and the process the chassis utilizes in turning will be set forth.

Referring to FIGS. 1B and 2B, the telescoping stinger S is illustrated. Specifically, two outer and receiving beam members 14 and 16 extend over to receive inner members 18 and 20. The respective received and inner members 18, 20 are jointed together at a vertical articulating joint J which is hinged about a point J having an axis 26. Because joint J must telescope within receiving member 14, it has an overall section whereby it fits within member 14.

A latch mechanism L1 and L2 is shown for locking members 14, 16 to members 18, 20. This locking mechanism prevents relative movement of the members and maintains the stinger S in selected relatively telescoped positions.

Member 18 when telescoped within receiving member 14 protrudes outwardly at the forward end thereof. As will hereinafter become more apparent, this beam causes a locking mechanism 30 to pivot out of the way of locking engagement to the tractor T (partially shown in the view of FIG. 1B). This enables the chassis to conventionally pivot and turn with respect to the tractor T during normal hauling.

Referring to FIG. 2B, stinger S is shown in the expanded position. Latches L1 and L2 have been moved to the extended position on their respective receiving beams 14, 16. At the same time, the inner members 18, 20 are now telescoped outwardly and exposed. The articulating joint J hinged about its axis 26 is clear of the receiving beam member 14 and is free to pivot.

One detail is shown in the view of FIG. 2B that is not apparent from FIG. 1B. Specifically, an articulating joint J is attached to a second telescoping beam member 36. Beam member 36 is free to move relative to beam member 18 when pin 38 is pulled.

As will become more apparent, when the chassis turns as shown in the view of FIG. 2A, the container D1 holds the stinger S to an appropriate length. Nevertheless and in order to accommodate the turning motion here illustrated, it is required that joint J telescope with respect to beam 18 to permit the described steering.

All telescoping members 14, 16, 18, 20 and 36 are provided with stops to prevent inadvertent disassembly. These stops are conventional and therefore are not shown.

It will be noted that chassis lock 30 moves to the locked position responsive to the contraction of member 18 within receiving member 14. Locking of the forward portion of the stinger 14 to the tractor as illustrated in FIG. 2B can occur.

Referring to the detail of FIG. 4A and 4B, latch mechanism L1 and pin 18 are illustrated. It can be seen that latch mechanism L1 holds together outer receiving beam 14 and inner receiving beam 18. Likewise, pin 38 (shown inserted in FIG. 2C) pins together received beam 38 and telescoping beam 36. It is telescoping beam 38 which is mounted to joint J, the articulating joint of this invention which allows the steering of the rear tandem wheel set W when the stinger is in the elongated position of FIG. 2B.

Having set forth the construction and operation of the stinger, the chassis lock to the tractor may now be discussed.

Referring to FIG. 4A, locking mechanism 30 is shown in the locked position. Specifically, ears 51, 52 attached to crank 55 and ears 53, 54 attached to the crank 55 are shown pivoted on either side of respective tractor frame members 56, 57. Tractor frame members 56, 57 are rigidly fixed to the tractor. The function of the ears 51, 52 and 53, 54 is to capture the frame members 56, 57. In such capture, the forward portion of the chassis must turn as the tractor turns. Other kinds and varieties of locks may as well be used.

Referring briefly to the view of FIG. 2B, it can be seen that the lock mechanism 30 is down, the tractor cab has turned and the forward portion of the chassis C has likewise turned.

Referring also to FIG. 2B, it is seen that it is necessary for the bolsters B to turn. Accordingly and referring to FIG. 4B, the rear tandem wheel set W has the chassis C at the rear portion overlying the towed tandem wheel set W. Bolster B is mounted on a conventional bearing pad 70. The bolster B turns relative to the towed wheel set W.

Returning briefly to FIGS. 2A and 3, it will be seen that there is a forward bolster F and a rear bolster G. Both forward bolster F and rear bolster G are required to turn. Since the mechanism for allowing forward bolster F to turn is the same as that mechanism allowing forward bolster G to turn, further discussion is not required.

Having set forth the operative structural components of the invention, the operating sequence can now be explained.

With respect to picking up a short load, the chassis is maneuvered to the position shown in FIG. 1A with the stinger in the disposition shown in FIG. 1B. Typically the rear wheel set W is locked with the tractor backed to and towards the rear wheel set W. Locking mechanisms L1 and L2 are set for the short length of the stinger. When the respecting lock mechanisms L1 and L2 overlie mating holes 80, locking of the stinger will occur. Joint J is received with receiving member 14. There is no articulating action to the stinger S.

Bolsters F and G can be moved to and locked at right angles to the stinger S. Container D (here shown as a 28 foot container) is loaded onto the chassis C. (See FIG. 1A)

It may be desirable to pull a 20 foot container. In this case, the forward end of the 20 foot container is loaded and locked to a bolster F1. Thus, it can be seen that the chassis of this invention will tow a trailer having a 20 foot chassis thereon (See FIG. 1A).

It sill be seen that the locking mechanism 30 in the view of FIG. 1A is in the upward and unlocked position. This being the case, the pivot between the tractor T and the chassis C will occur at the fifth wheel. No articulation of the stinger S will occur as the joint J is within the receiving member 14 (see FIG. 1B).

Assuming that container D is off loaded and if it is desired to load a container D1 (here shown of the 48 foot variety), the following steps will be utilized. (See FIG. 1B)

First, the respective latches L1 and L2 will be moved to the fully extended 48 foot length of the container. The rear and towed tandem wheel set W will be locked and the tractor T driven away. As the tractor T drives away, the spring bias latch mechanisms, L1, L2, will lock with respective apertures on received beams 18 inside of receiving beam 14 and received beam 20 inside of receiving beam 16. The chassis will be locked with the bolsters F and G 48 feet apart. See FIG. 2B.

Secondly, the chassis will be driven straight under a container loading mechanism. Bolsters F and G will be moved at right angles to the stinger S. The container D1 will be loaded.

When the container D1 has been loaded, two additional steps will be accomplished. First, pin 38 will be pulled. Pulling of pin 38 will allow beam 36 to telescope into and out of received beam 18. Telescoping movement of the joint J relative to receiving·beam member 14 will be enabled.

Secondly, the tractor T will be locked to the tractor chassis via lock 30. This will occur as has been described with respect to detail 5A.

The chassis will be ready for towing by the tractor and turning.

The process of tractor turning can now be seen and fully understood with respect to FIG. 3.

FIG. 3 is an overlying view of the tractor T shown turning right. The tractor driven tandem wheel set 80 is shown following the steered tractor wheels 82. The forward portion 84 of the chassis is shown pivotally moving out from under the container D1. This movement occurs so that joint J actually extends to the side of the container D1. Rear tandem wheels W on chassis C are forced to move. This movement is caused by telescoping of beam 36 interior of beam 18 and articulation of the joint J.

By drawing the respective axis 90, 92 of the wheel sets and noting their points of intersection, the described radius of curvature of turn is illustrated.

It will be seen that forward bolster F and rear bolster G have been required to pivot in order to support container D1. At the same time, steered movement of the container D1 is accommodated.

Off loading of the container and movement of the chassis to its contracted position shown in FIG. 1B is the reverse of that previously illustrated. It will not be set forth here.

Although the foregoing has been a description of the preferred embodiment of the invention, examples thereof, and the best mode for carrying it out, this description is intended to illustrate and explain the invention, rather than limit it. The scope of the invention may be ascertained from the appended claims.

What is claimed is:

1. A chassis having a telescoping articulating stinger for hauling a container comprising in combination:
   a fifth wheel for mounting the forward portion of said chassis to a towing tractor;
   a forward bolster pivotally mounted overlying said fifth wheel for receiving the forward end of said container;
   a rear tandem wheel set;
   a rear bolster pivotally mounted overlying said rear tandem wheel set;
   a telescoping stinger having at least an outer receiving telescoping member and an inner received telescoping member;
   said telescoping stinger attached to said fifth wheel at a forward end and to said rear tandem wheel set at a rear end to tow and steer said tandem wheel set;
   an articulating joint mounted to said inner received telescoping member for telescoping into and out of said outer receiving telescoping member whereby said inner received telescoping member can articulate relative to said outer receiving telescoping member to permit articulated movement of said inner member when said articulated joint is free of said outer receiving member and to prevent articulation when said articulated portion of said inner member is within said outer receiving telescoping member;
   means for locking a towing tractor to said forward portion of said chassis whereby when said chassis is loaded with a container at said pivotal bolsters and encounters a turn, said stinger telescopes and articulates to steer said rear wheel set responsive to the angle of the tractor and locked forward portion of the chassis relative to the rear portion of the chassis and tandem wheel set.

2. In combination with a chassis for hauling a container including:
   a towing tractor;
   a towed chassis having a first portion for turning with said tractor and a second portion for turning and towing relative to said first portion with an articulated joint therebetween;
   an articulating and telescoping stinger having received and receiving relatively telescoping members;
   an articulating joint mounted to said stinger and movable to and from a position of articulation relative to the telescoped disposition of said received and receiving relatively telescoping members;
   a locking mechanism attached to said first portion of said chassis to said tractor for locking said first portion of said chassis to turn with said chassis in a first position and to permit said forward portion of said chassis to turn independent of said tractor in a second position.

3. The combination of claim 2 and further including in said locking mechanism;
   a lock activating mechanism responsive to the relative movement between said received inner telescoping member to move said locking mechanism between said first position and said second position when said inner telescoping member is received within said outer receiving telescoping member.

4. A tractor and chassis combination comprising:
   a towing tractor including a king pin;
   a chassis including a fifth wheel for mounting the forward portion of said chassis to a towing tractor at said king pin;
   said chassis including a forward bolster pivotally mounted overlying said fifth wheel for receiving the forward end of a container;
   a rear tandem wheel set;
   a rear bolster pivotally mounted overlying said rear tandem wheel set at the rear of said chassis;
   a telescoping stinger having at least an outer receiving telescoping member and an inner received telescoping member;
   said telescoping stinger attached to said fifth wheel at a forward end and to said wheel set at a rear end to tow said rear tandem wheel set;
   an articulated joint mounted to said inner received telescoping member for telescoping into and out of said outer receiving telescoping member, whereby said inner received telescoping member can articulate relative to said outer receiving telescoping member to permit articulated movement of the inner received telescoping member when said articulated joint is free of said outer receiving member and to prevent articulation when said articulated portion of said inner member is within said outer receiving telescoping member;
   means for locking said towing tractor to said forward end of said chassis whereby when said chassis is loaded with the container at said pivotal bolsters and encounters a turn and said stinger telescopes with said articulated joint free of said outer receiving telescoping members, said stinger articulates to steer said rear wheel set responsive to the angle of said tractor and locked forward portion of said chassis relative to the rear portion of said chassis and said tandem wheel set.

5. A chassis and container in combination:
   said chassis comprising a fifth wheel for mounting the forward portion of said chassis to a towing tractor;
   a forward bolster pivotally mounted overlying said fifth wheel for receiving the forward end of said container;
   a rear bolster pivotally mounted overlying said rear tandem wheel set at the rear portion of said chassis;
   a container mounted at the forward portion of said chassis to said forward bolster and at the rear portion of said chassis to said rear bolster;
   a telescoping stinger having at least an outer receiving telescoping member and an inner received telescoping member;
   said telescoping member attached to said fifth wheel at the forward end and to said rear tandem wheel set at the rear end to tow and steer said tandem wheel set;
   an articulating joint mounted to said inner received telescoping member for telescoping into and out of said outer receiving telescoping member;
   means for selectively locking and unlocking a towing tractor to the forward portion of said chassis whereby when said container encounters a turn said stinger telescopes and articulates to steer said rear wheel set responsive to the angle of said tractor and lock forward portion of said chassis relative to the rear portion of said chassis and said tandem wheel set.

* * * * *